Patented Oct. 28, 1930

1,779,822

UNITED STATES PATENT OFFICE

KOJYU NOGUCHI, OF TOKYO, JAPAN, ASSIGNOR TO MITSUBISHI ZOSEN KABUSHIKI KAISHA, OF TOKYO, JAPAN

PROCESS OF MANUFACTURING ELECTRIC HEATING ELEMENTS

No Drawing. Application filed June 25, 1928, Serial No. 288,309, and in Japan October 31, 1927.

This invention relates to a process of manufacturing electric heating elements having a compact filler principally made of alumina or magnesia, characterized by mixing powdered aluminium or powdered magnesium with powdered oxide or hydroxide of alkali-earth metals such as calcium, barium, magnesium, strontium etc., filling the mixture in the space formed between a tube made of metal or other refractory material and electric heating wire inserted in said tube, and subjecting the mixture to chemical action by adding water or lime water, or introducing water vapour into it. The object of the invention is to fill up the space formed between the heating wire and the tube compactly with filling materials of refractory and electrically non-conductive nature with great ease and in a simple way, and thereby to manufacture an electric heating element having good electrical insulation, good heat conductivity and refractoriness, which is suitable to be used for an electric immersion heater or other similar purposes.

Generally it is a difficult work to seal an electric heating wire within a small metallic tube, with a compactly filled refractory material having good electrical insulation and high heat conductivity.

According to this invention, alumina and magnesia are used as the filling materials, as they are suitable for the said purpose. In the explanation of the invention aluminium will be taken as an example. Needless to say, magnesium may also be used for the same purpose.

Aluminium may be chemically converted into aluminium hydroxide with ease by alkaline solutions such as solutions of caustic soda, caustic potash etc. In this case, however, as caustic soda or potash remains more or less in the mixture, they can not be used for the purpose of the present invention because the electrical insulation of the filler is impaired by the presence of them. Aqueous solution of oxides of alkali-earth metals, also, reacts with aluminium though with less speed. Further, the oxides of alkali-earth metals do not make the filler electrically conductive and accordingly are suitable for the purpose of the invention. All oxides of alkali-earth metals, i. e. barium, strontium, calcium or magnesium, among which calcium oxide is the best in practice, can be used for the present purpose. Therefore, by taking this material as an example, a practical method for carrying out the invention is herewith explained.

Fine powder of calcium oxide (quick lime) or of calcium hydroxide (slaked lime) is mixed with powdered aluminium. When the mixture is added with water, it evolves heat and a reaction occurs between aluminium and water liberating hydrogen vigorously. The reaction ends when aluminium contained in the mixture is wholly converted into alumina. The chemical product is far more voluminous than the volume of the mixture previous to the chemical action. For instance, a mixture of 1 part (by weight) of lime and 3 parts (by weight) of aluminium increases by the chemical action to 3 times of the original volume. This increase in volume depends on the ratio of mixing lime and aluminium and the greater the quantity of aluminium the larger is the increase in volume. When such change of volume takes place in a sealed rigid vessel, the vessel will be compactly filled up with the material chemically combined.

The principle of the reaction according to the present process is merely

$$2Al + 6H_2O = 2Al(OH)_3 + 3H_2$$

and can be carried into practice only by aluminium powder and water.

The velocity of this reaction, however, is very small and moreover the surface of aluminium may be covered by hard film of $Al(OH)_3$ which will at last stop the reaction. In order to continue the reaction it is necessary to make the solution basic.

According to this application, this basicity, which is necessary for dissolving aluminium, is supplied from aqueous solution of CaO containing $Ca^{++}+2(OH)^-$.

The reaction takes place as follows:

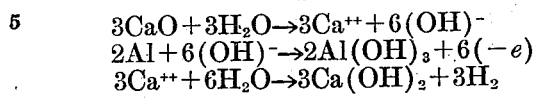

Summing up these formulæ

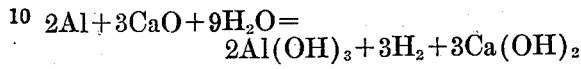

Thus, the ions $Ca^{++}$ and $(OH)^-$ are not exhausted at all and thus CaO acts as a kind of catalytic substance through the whole course in which aluminium is consumed, which is indeed a matter to be noticed as a characteristic feature of the application.

If in this case, NaOH or KOH is used instead of CaO, the $Al(OH)_3$ produced and $Na^+$ or $K^+$ ion will act to produce $Na_2Al_2O_4$ or $K_2Al_2O_4$. However, when $Ca(OH)_2$ is used according to this application, $CaAl_2O_4$ is very unstable and cannot be produced. Therefore, CaO is a very favorable material for the purpose of this application and by a small quantity of CaO, a very large quantity of aluminium can be easily changed to $Al(OH)_3$. Of course the quantity of CaO used relates to the velocity of reaction and even with a very small quantity thereof will act sufficiently if a sufficiently large period is given.

In carrying out the said process practically for manufacturing electric heating element sealed in a metallic tube, several different methods may be adopted. An example will be described. First, electric heating wire is inserted in a metallic tube used as the shell of the heating element, and is kept in a correct position inside the said tube by a proper means; then the tube is filled up with a mixture of powdered quick lime or slaked lime and powdered aluminium, and if required, the tube is bent into desired shapes. Next, water, lime water or high pressure steam is forced into the tube in order that the chemical reactions as mentioned above may take place. Alternatively water may be supplied to the mixed filler through a small pipe previously inserted into the tube together with the heating wire; the water tube is gradually pulled out while the water is being supplied to the filler, and is wholly taken out before the chemical reaction becomes violent. There is an ample time from the beginning of injecting water to the climax of the reaction and therefore any operations to be made in the meantime such as water injection and the like may be finished before the heat evolution becomes violent. With either of the practical methods described above the same result may be obtained. After the product cools down, it is reheated to above 150° C., to dry up the mass, and thus a compact filler made of alumina mixed with lime is produced.

The filler thus produced is very refractory and has a good electrically insulating nature as both of the constituents alumina and lime, are of such properties. Also the filler has a sufficient heat conductivity as it is compactly filled up. Moreover, as the heating wire is not exposed to air, its oxidation is wholly prevented, and accordingly its life for use is considerably elongated.

As stated above, all the oxides of alkali-earth metals, other than calcium, may be used for this purpose.

I claim:

1. A process of manufacturing an electric heating element having a compact filler composed principally of alumina, which includes the steps of mixing powdered aluminium with powdered lime, filling the space between an electric heating element and its metallic sheath with this mixture, and adding water, thereby converting the aluminium into alumina.

2. A process of manufacturing an electric heating element having a compact filler composed principally of alumina, which includes the steps of mixing powdered aluminium with powdered lime in approximate proportions of 2 to 1, filling the space between an electric heating element and its metallic sheath with this mixture, and adding water, thereby converting the aluminium into alumina.

In testimony whereof I affix my signature.

KOJYU NOGUCHI.